US008437596B2

(12) United States Patent
Nair et al.

(10) Patent No.: US 8,437,596 B2
(45) Date of Patent: *May 7, 2013

(54) SYSTEM FOR AN INTERNAL ROTATING STORAGE SPOOL COMBINED WITH TOP AND BOTTOM CABLE ACCESS IN A FIBER DISTRIBUTION TERMINAL

(75) Inventors: K. R. Suresh Nair, Cochin (IN); Kizakkekuttu Parameswaran Chandran, Cochin (IN); Muhammed Iqbal, Kochi (IN); Biji Mathew, Valamboor (IN); Mathew Anjilivelil Thomas, Cochin (IN); Aniz Muhammad, Pathanamthitta (IN)

(73) Assignee: Opterna Technology Limited, Limerick (IE)

( * ) Notice: Subject to any disclaimer, the term of this patent is extended or adjusted under 35 U.S.C. 154(b) by 135 days.

This patent is subject to a terminal disclaimer.

(21) Appl. No.: 13/076,301

(22) Filed: Mar. 30, 2011

(65) Prior Publication Data
US 2011/0176784 A1 Jul. 21, 2011

Related U.S. Application Data

(63) Continuation of application No. 12/347,624, filed on Dec. 31, 2008, now Pat. No. 8,081,857.

(51) Int. Cl.
*G02B 6/00* (2006.01)
(52) U.S. Cl.
USPC ............ 385/135; 385/134; 385/136; 385/137
(58) Field of Classification Search .................. 385/134, 385/135, 136, 137
See application file for complete search history.

(56) References Cited

U.S. PATENT DOCUMENTS

| 5,551,545 | A  | 9/1996  | Gelfman        |
| 6,220,413 | B1 | 4/2001  | Walters et al. |
| 6,396,989 | B1 | 5/2002  | Johnston et al.|
| 6,554,221 | B2 | 4/2003  | Hinds          |
| 6,711,339 | B2 | 3/2004  | Puetz et al.   |
| 6,796,721 | B2 | 9/2004  | Matsumoto et al.|
| 7,017,846 | B2 | 3/2006  | Tsoi et al.    |
| 7,292,763 | B2 | 11/2007 | Smith et al.   |

(Continued)

OTHER PUBLICATIONS

The Notification of Transmittal of the International Search Report and Written Opinion of the International Searching Authority issued in Int'l Patent Application No. PCT/US2009/068520, prepared Feb. 12, 2010, and mailed Feb. 26, 2010, 9 pages.

(Continued)

*Primary Examiner* — Jennifer Doan
(74) *Attorney, Agent, or Firm* — Sterne, Kessler, Goldstein & Fox P.L.L.C.

(57) ABSTRACT

A fiber distribution terminal for use in an environmentally sealed enclosure can include a rotatable spool for housing input fiber cable. The spool is configured to be mounted in the environmentally sealed enclosure. The fiber distribution terminal can also include an adapter pack that secures the connections between fibers of the input fiber cable and fibers of the output fiber cable. The fiber distribution terminal can include an adapter plate that guides the routing of both the input and output fiber cables internal to the enclosure. The fiber distribution terminal can also include a spool lock that can direct the cable routing to a first side or a second side of the fiber distribution terminal.

13 Claims, 7 Drawing Sheets

U.S. PATENT DOCUMENTS

| | | |
|---|---|---|
| 7,327,926 B2 | 2/2008 | Barth et al. |
| 7,340,144 B2 | 3/2008 | Dobbins et al. |
| 7,346,253 B2 | 3/2008 | Bloodworth et al. |
| 7,623,749 B2 | 11/2009 | Reagan et al. |
| 7,756,379 B2 | 7/2010 | Kowalczyk et al. |
| 7,889,962 B2 * | 2/2011 | Nair et al. .................... 385/135 |
| 7,894,701 B2 | 2/2011 | Kowalczyk et al. |
| 8,081,857 B2 * | 12/2011 | Nair et al. .................... 385/135 |
| 8,081,858 B2 * | 12/2011 | Nair et al. .................... 385/135 |
| 2006/0210230 A1 | 9/2006 | Kline et al. |
| 2008/0292261 A1 | 11/2008 | Kowalczyk et al. |
| 2009/0074370 A1 | 3/2009 | Kowalczyk et al. |
| 2010/0310224 A1 | 12/2010 | Kowalczyk et al. |

OTHER PUBLICATIONS

Office Communication, dated Aug. 4, 2010, for U.S. Appl. No. 12/347,624, filed Dec. 31, 2008, 10 pages.

Notice of Allowance, dated Jan. 1, 2011, for U.S. Appl. No. 12/347,624, filed Dec. 31, 2008, 7 pages.

* cited by examiner

SYSTEM FOR AN INTERNAL ROTATING STORAGE SPOOL COMBINED WITH TOP AND BOTTOM CABLE ACCESS IN A FIBER DISTRIBUTION TERMINAL

CROSS REFERENCE TO RELATED APPLICATION

This application is a continuation of U.S. application Ser. No. 12/347,624, filed Dec. 31, 2008, which is hereby incorporated herein in its entirety by reference hereto.

BACKGROUND

1. Field

The present invention relates to a fiber distribution terminal having an internal spool for storing and protecting fiber cable.

2. Background

A Fiber Distribution Terminal (FDT) is used to interconnect multiple fibers, typically originating from a common point, and distributed to multiple different locations with output fiber cables. A FDT typically comprises an enclosure wherein connections are made between a larger multi-fiber bundle input cable and individual output fiber cables. The typical application configuration for the use of an FDT is in buildings such as multi-unit residences or commercial/office buildings. There could be a single FDT per building or perhaps one or more per floor or any combination in between depending on the fiber connection needs and capacity of the building.

One recurring issue faced when dealing with the installation of FDTs is how much input fiber is required to connect the FDT to some common point, which is often outdoors where the connections to the larger fiber networks (e.g., city wide fiber network) are made. The common point could also be within the same building, perhaps on another floor or in the basement of the building. No matter the location of the common point, the issue remains that it is often necessary to physically locate the FDT before the approximate required length of fiber cable is known. Issues involved with not knowing the required length of fiber cable could present themselves in at least two ways. First, it might be necessary to approximate and prepare a length of fiber cable before installation of the FDT occurs. If the approximation is too short then the connection to the FDT cannot be made without further fiber cable splices or another length of fiber cable will have to be obtained. Conversely, if the approximation is too long, then the excess slack of fiber cable will have to be stored somewhere along the length of fiber cable. This creates the possibility of introducing unwanted bends and thus unwanted bend loss into the fiber cable path. Second, it might be necessary to relocate the FDT so that the chosen or available fiber cable length is approximately correct, which could mean placing the FDT in an undesirable location. These problems arise because there is presently no safe way to store excess fiber cable after installation nor feed fiber cable from an installed FDT. Another problem is that there is no convenient way to store the input fiber cable prior to installation of the FDT.

It would be convenient to affix the box to its permanent location and to make the input fiber cable connections before having to connect the input fiber cable to the common point. Presently this is not possible. There are FDTs available that include an external spool of fiber cable but they do not allow the FDT enclosure to be affixed to its permanent location because the enclosure must rotate with the external spool of fiber cable. This also prevents the installer from making the input fiber connections to the adapter pack prior to connection of the input fiber cable.

Available FDTs have only one output direction for the input and output fiber cables that are entering and exiting the FDT enclosure. This ensures that the routing of the cables internal to the enclosure is always oriented in the same direction. But this often makes the external installation difficult and the routing of cables external to the FDT enclosure cumbersome. This can occur in situations where the external fiber routing needs to go to a higher floor and the FDT only has fiber cable outputs to the bottom of the enclosure (relative to the mounting orientation), meaning that the fiber cables must make a 180 degree turn after they leave the enclosure. This often results, especially with less experienced installers, in damage to the fiber cable, usually due to inadvertent bend loss.

It is also important to protect the fiber cables when they are internal to the FDT enclosure. Typical enclosures contain connection blocks where the fibers of the larger input cable are individually matched to single output cables. Both the input and output cables are separately routed through the enclosure, with the installer having the responsibility of routing the fiber cables in such a way so as to avoid bends in the cable and thus bend loss. Installers, who may or may not be conscious of this responsibility, might not always appreciate the impact of their craftsmanship. Routing secured by cable ties or other more industrial type retaining clips could easily create inadvertent bends in the fiber cables, thus causing undesired loss of signal strength in the fiber cables.

Therefore, it is desirable to have a FDT that conveniently stores fiber cable prior to installation and houses excess fiber cable after the input cable connection has been made. It is also desirable for the FDT to house the input fiber cable to output fiber cable connections and safely route the cables internal to the FDT enclosure to avoid bend loss while allowing the input and output fiber cables to enter/exit through either of two sides to the enclosure.

SUMMARY

According to an embodiment of the invention, there is provided a fiber distribution terminal (FDT) including an environmentally sealed enclosure. The FDT has a spool for housing input fiber cables disposed in the enclosure and mounted for rotation therein. The FDT further comprises an adapter pack contained within the enclosure for securing connections between fibers of the input fiber cables and fibers of output fiber cables. The FDT also comprises an adapter plate contained within the enclosure for routing the input and the output fiber cables internal to the enclosure.

In another embodiment of the invention, there is provided a FDT having an environmentally sealed enclosure with an internal spool, and adapter pack, and further including a spool lock which is configured to direct the cable routing to one of the first side or second side of the FDT.

BRIEF DESCRIPTION OF THE DRAWINGS

Embodiments of the invention will now be described, by way of example only, with reference to the accompanying schematic drawings in which corresponding reference symbols indicate corresponding parts, and in which.

DETAILED DESCRIPTION

While the invention is described herein with reference to illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility.

Figure 1:
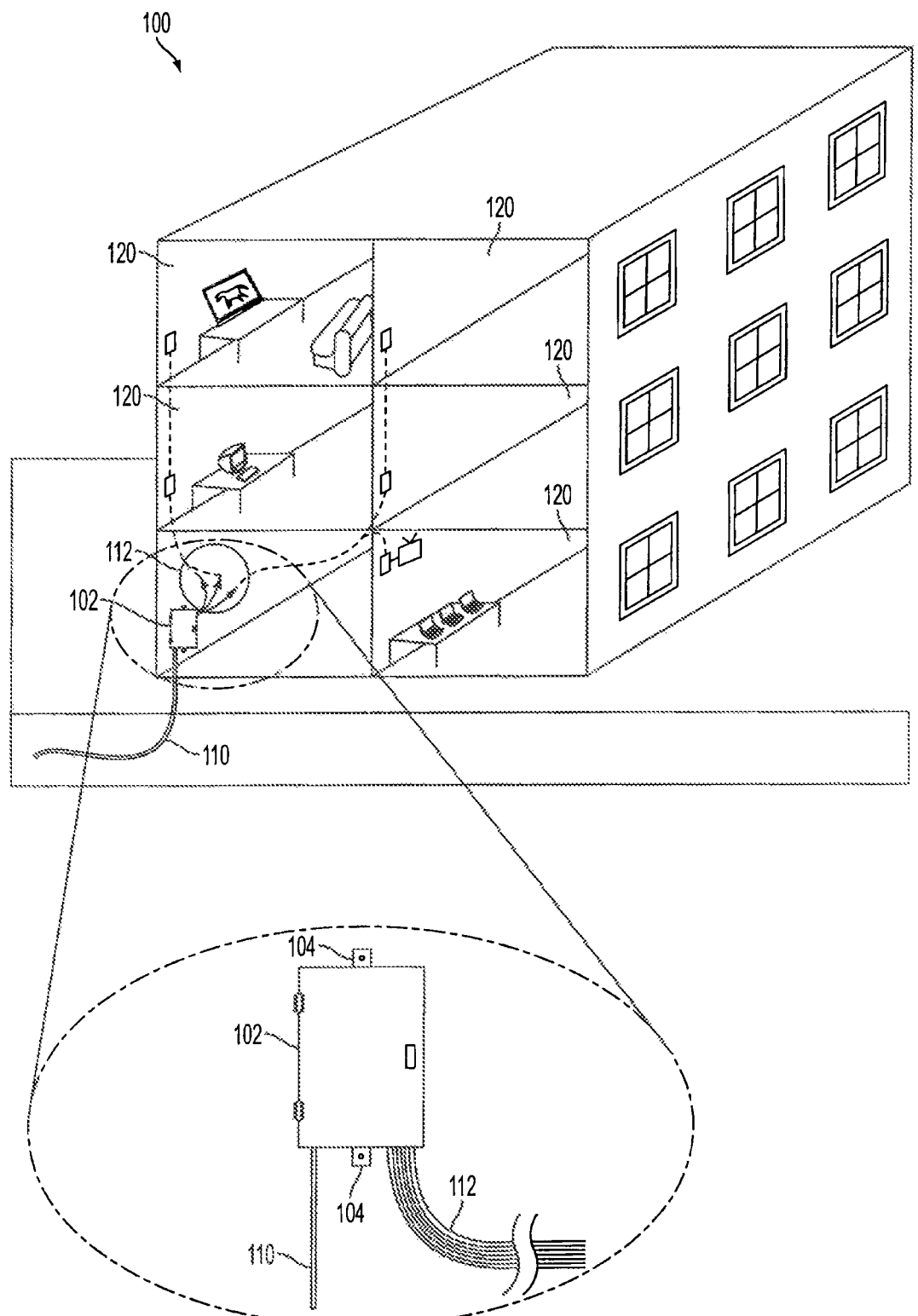
FIG. 1 depicts a multi-unit building which is a typical application situation for the use of a fiber distribution terminal (FDT)

FIG. 1 depicts a multi-unit building 100 according to one embodiment of the invention. The multi-unit building 100 includes separate units 120, one or more of which have a necessity or desire to have fiber cable service in their unit. Each separate unit 120 typically only needs a single output fiber connection 112, but a typical situation in a multi-unit building 100 would have some plurality if not the entire building needing or desiring the fiber cable service. The fiber cable provider will run a larger bundled input fiber 110 to the multi-unit building 100 where it is routed and connected through what is known as a fiber distribution terminal (FDT) 102. The FDT is secured to an interior wall in the basement or a communication closet within the multi-unit building 100 via supplied mounting brackets 104 allowing the FDT 102 to be securely placed in order to protect the fiber cables which can be easily damaged if care is not taken in their placement, routing, and storage. The input fiber 110 is actually multiple fiber cables bundled together into a larger cable for easier routing to some central location. The input fiber 110 is inputted into the FDT 102. Internal to the FDT 102, the individual fiber cables that comprise the input cable 110 are separately connected to individual output cables 112. Then each output fiber cable 112 is routed to a separate unit 120, where the output fiber cable 112 can be connected to other equipment that is capable of translating the fiber cable signal into useful information.

Figure 2:
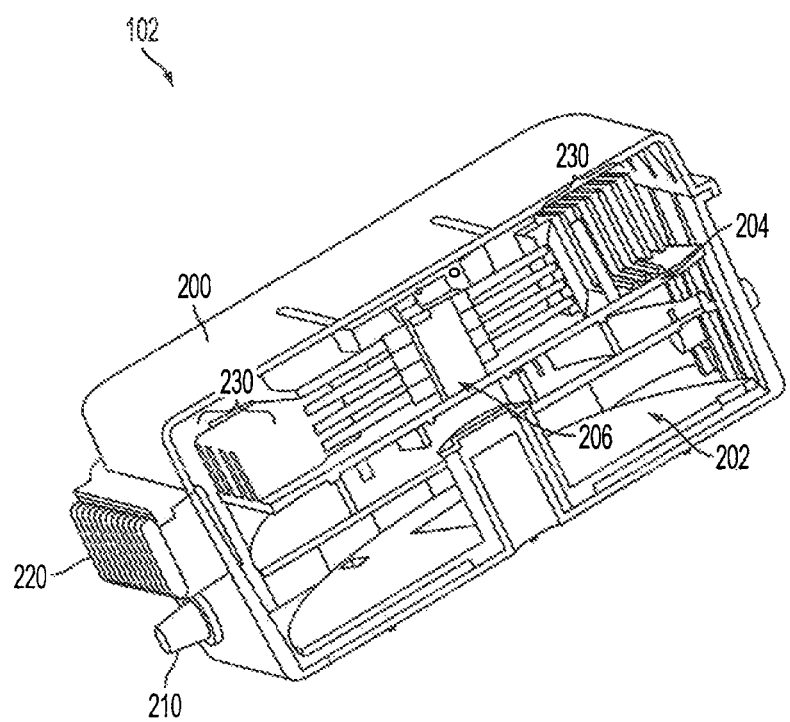
FIG. 2 is a cross-sectional view of one embodiment of the invention.

FIG. 2 is a cross-sectional view of one embodiment of the invention. The fiber distribution terminal 102 comprises several components. Because of the need to protect connections from environmental dangers, it is desired to house the components inside an environmentally sealed enclosure 200. Internal to the enclosure 200 is a spool 202, an adapter pack 206, and an adapter plate 204. The adapter plate 204 is coupled to and rotates with the spool 202. As an addition to the adapter plate 204, the enclosure 200 includes a set of fiber cable guides 230. There are also locations on the enclosure 200 for passing the input 110 and output 112 cables through. These locations are filled and secured with an input grommet 210 and a set of output grommets 220.

Figure 3:
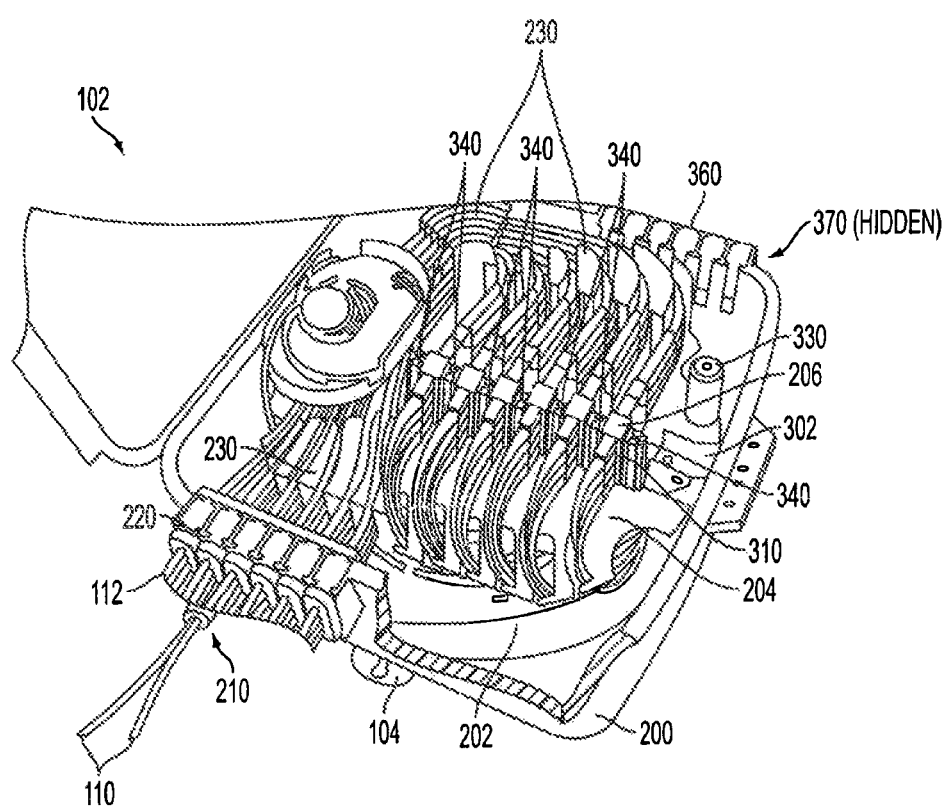
FIG. 3 is an internal view (with the enclosure door open) showing the adapter plate cable routing and the adapter pack cable connections with the internal spool disposed beneath.

FIG. 3, is an internal view (with the enclosure door open) of FDT 102. Additional components in FIG. 3 that have not been previously disclosed are a spool lock 302, a Splice Closure/Angled Physical Contact (SC/APC) adapter 310, a handle 330, an input plug 370, and output plugs 360.

The spool 202 is used to house the input fiber cable 110 inside the enclosure 200. The spool 202 is disposed internal to the enclosure in such a way that it is free to rotate inside the enclosure. The larger bundled fiber cable 110, which is a single cable comprised of multiple (e.g., twelve fibers) individual fibers, is fed through an input grommet 210 in the enclosure 200, and can be extended to the maximum storage capacity of the spool. In one embodiment the spool is capable of storing two 200 ft input fiber cables. If two input fiber cables are stored, they must be extended together. Because of the design of the FDT 102, it is not practical to install the input fiber cable 110 after the FDT 102 has been assembled. Thus the FDT 102 is shipped with the input fiber cable 110 already installed on the spool 202. Thus, the FDT 102 also serves as a shipping container for the spool 202 of input fiber cable 110.

The input grommet 210 which will be described in more detail below, is capable of housing two separate bundled input fiber cables 110 each containing multiple individual fiber cables. The input fiber cable 110 that is fed through the input grommet 210 is then connected via other fiber network components (not shown) to the larger fiber network (i.e., street connection or larger). The other end of the input fiber cable 110 is unbundled into the individual fiber cables which make up the larger input fiber cable 110. Each individual fiber cable is then connected to an SC/APC adapter 310. In at least one embodiment, the SC/APC adapter 310 allows for four individual cables to be connected per adapter 310. The SC/APC adapters 310 are located using a series of adapter posts 340 at a central position internal to the FDT enclosure 200. In at least one embodiment, there are six input side SC/APC adapters 310 and seven adapter posts 340 for positioning the adapters 310. There are guidance slots 350 in the adapter plate 204 which provide a convenient and safe way to route the individual cables of the input fiber cables 110 from the spool 202 to the SC/APC adapters 310 located on the opposite side of the adapter plate 204. In at least one embodiment, there are six guidance slots 350 so that four individual fiber cables of the input fiber cables 110 can be routed through each slot.

The spool 202 can feed input fiber cable 110 through the input grommet 210 up to the maximum spool capacity. The input fiber cable 110 is then routed as needed and any excess input fiber cable 110 can be manually retracted onto the spool 202 through the input grommet 210 by turning the handle 330 internal to the enclosure. In an embodiment of the invention, excess input fiber cable 110 does not have to be stored outside of FDT 102, but rather is safely re-spooled on to spool 202. This helps avoid unnecessary damage such as bends or pinches of the input fiber cable 110 which can drastically reduce the signal quality that the input fiber cable 110 is capable of transmitting.

One end of the output fiber cables 112 have a SC/APC adapter 310 mate so that the output fiber cables 112 can be coupled to the input fiber cables 110. The end of the output fiber cable 112 to which the SC/APC adapter 310 is attached is the end that is internal to the FDT enclosure 200. In at least one embodiment, the SC/APC adapter 310 allows for four individual cables to be connected per adapter 310. The SC/APC adapter 310 on the output fiber cables 112 are kept organized and safely located using the same series of adapter posts 340 as the input side SC/APC adapter 310 used, which is located at a central position internal to the FDT enclosure 200. The area where the input and output side SC/APC adapters 310 are coupled and held in place by the adapter posts 340 is collectively called the adapter pack 206, and any reference to the adapter pack 206 is synonymous with at least one input/output coupled SC/APC adapter 310 pair held by the adapter posts 340. The purpose of the adapter pack 206 being contained within the enclosure 200 is to secure the connections between independent fibers of the input fiber cable 110 and independent fiber cables of the output fiber cable 112. In at least one embodiment, the adapter pack 206 comprises six mated pairs of SC/APC adapters 310 held in place by adapter post 340.

The output fiber cable 112 connections are routed from the adapter pack 206 through a series of guides 230 to the output grommets 220. The guides 230 are part of the adapter plate 204 which is used for routing the output fiber cables 112 in a safe and organized manner internal to the enclosure. In one embodiment, the guides 230 are shaped structures coupled perpendicular to the plane of the adapter plate 204. The guides 230 are designed with specific radii which do not allow the output fiber cable 112 placed against the guides to bend more than the output fiber cable 112 specification allows, thereby minimizing bend loss within the output fiber cables 112. Thus, the guides 230 provide a convenient and organized way to route the output fiber cables 112 through the enclosure 200. The guides 230 are designed to maintain the output fiber cable 112 signal integrity. The adapter plate 204 and guides 230 are sized such that up to 70 mm cable connection boots, which are sleeves usually made of a flexible material that add a layer of protection to the connector, and up to 4.8 mm diameter cables can be used. The adapter plate 204 and guides 230 are also sized such that the use of Splice On Connectors (SOC) is facilitated. A SOC eliminates the need for field polishing of fiber cables in order to terminate connections. In one embodiment, there are at least three sets of guides 230 so that the output fiber cables 112 can make two 90 degree turns and be fanned out in order to line-up the output fiber cables 112 with the output grommets 220. However, more or less guides 230 may be needed based on the internal routing of the enclosure 200 and the bend tolerance specification of the particular output fiber cables 112 used. As mentioned above, the output fiber cables 112 are routed out of the enclosure 200 through output grommets 220. The number of output grommets 220 depends on the number of output fiber cables 112 that are to be routed out of the enclosure 200. In one embodiment, there are six output grommets 220 which each hold four output fiber cables 112.

As part of the adapter plate 204, there is at least one spool lock 302. The spool lock 302 is designed so that when engaged, it affixes the rotation of the spool 202 to a single position, impeding further rotation of the spool 202. In an embodiment of the invention, the spool lock 302 is a sliding latch that engages a pair of tabs designed into the wall of the enclosure 200. The introduction of the spool lock 302 allows the input and output fiber cables 110 and 112 of the FDT 102 to be routed from one of a plurality of sides of the enclosure 200. This flexibility of fiber cable routing can drastically improve the craftsmanship of a fiber distribution terminal 102 installation. In order to maintain an environmentally sealed enclosure 200, it is necessary to plug any of the input and output openings which are not used to route either input fiber cables 110 or output fiber cables 112. To accomplish this, at least one input plug 370 which is identical in shape to input grommet 210 but is a single solid piece, and a plurality of output plugs 360 which are identical in shape to output grommets 220 but are solid pieces, are placed in the unused openings of the enclosure 200.

Figure 4:
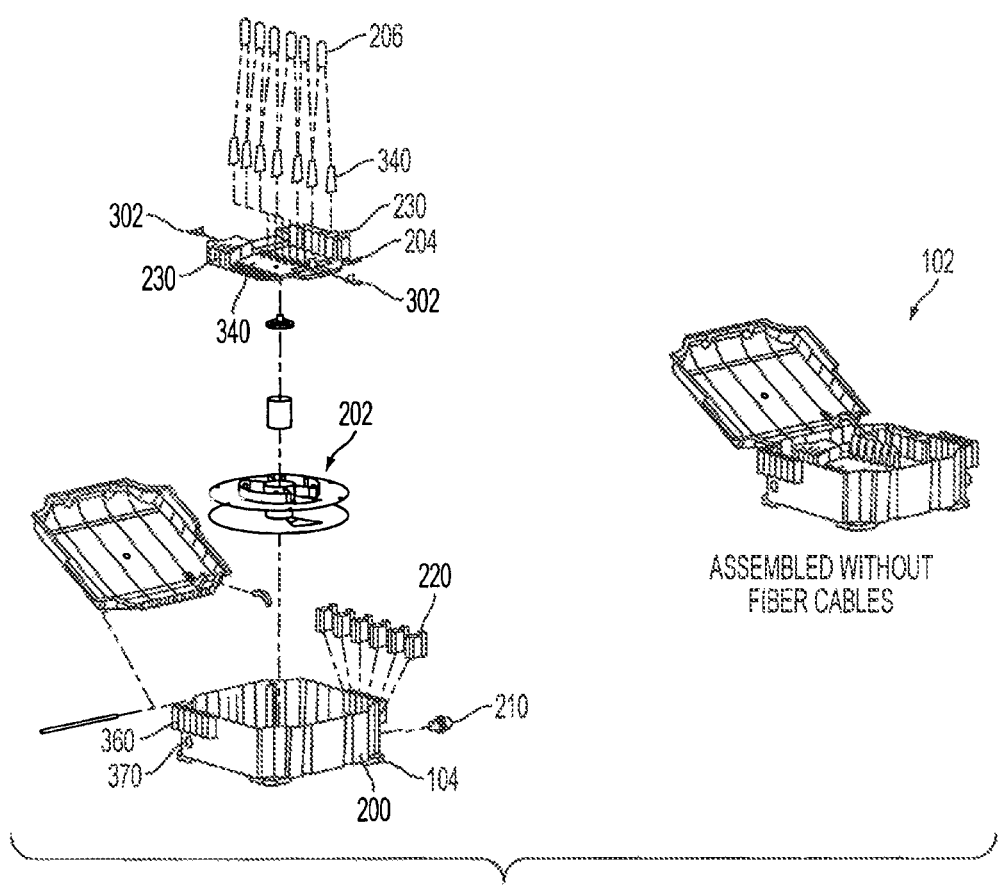
FIG. 4 is an exploded view of the elements of a FDT.

FIG. 4 is an exploded view of the elements of a FDT. No new parts are introduced, but the view allows for a better perspective of how the parts are coupled together. The adapter pack 206 is shown in FIG. 4 as a pill shaped piece which fits between the adapter posts 340; however, the adapter pack 206 is actually the mated connection of at least one of the input fiber cables 110 and the output fiber cables 112. Also note that in FIG. 4 the handle 330 is not shown. The input fiber cables 100 and the output fiber cables 112 which constitute much of the full implementation of the FDT 102 are not shown in FIG. 4 in order to make the main parts of the FDT 102 visible. The input and output plugs 360 and 370 are more visible in this perspective.

Figure 5:
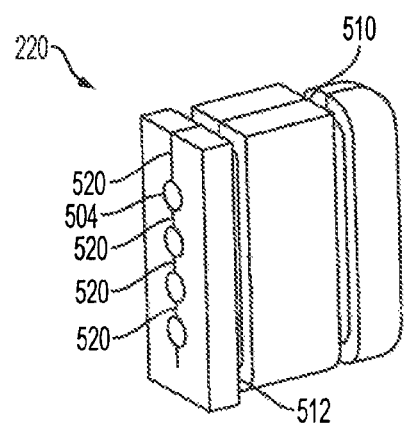
FIG. 5 depicts one of the output grommets capable of holding up to tour output cables.

FIG. 5 depicts one of the output grommets 220 capable of holding up to four output fiber cables 112. Specific features of the output grommet 220 are a pair of channels 510 and 512, at least one cylindrical void 504, and a split 520 down the center of the axis which cuts through the cylindrical void 504 of the output grommet 220. The channels are made such that they slip over protrusions fashioned in the enclosure 200 so that the output grommet 220 effectively seals itself in place, thereby keeping external environmental elements (e.g., water, bugs, etc. . . . ) out of the enclosure 200. The output grommet 220 is designed for a tight fit against the enclosure 200 protrusions and has two sealing channels 510 and 520, which increase the chance of creating an effective seal. This cylindrical void 504 provides an avenue for the output fiber cable 112 to be routed outside the enclosure. In one embodiment, the cylindrical void 504 can hold output fiber cables 112 in a range of sizes from 2 mm to 5 mm in diameter. The cylindrical void 504 is able to hold this range and also seal against components of the external environment because of internal output grommet 220 features which will be disclosed below in reference to FIG. 6. In at least one embodiment of the invention, the output grommet has four cylindrical voids 504 such that each grommet holds four output fiber cables 220, There are a total of six output grommets 220.

Figure 6:
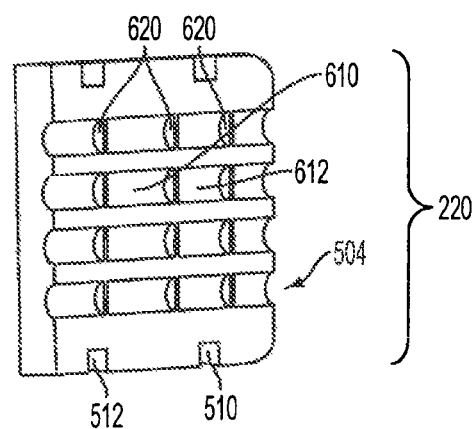
FIG. 6 is a cross-sectional view of the output fiber cable grommet of FIG. 5 showing the different chambers internal to the grommet.

FIG. 6 is a cross-sectional view of the output grommet 220 of FIG. 5 showing two different chambers 610 and 612 internal to the grommet. Internal to each cylindrical void 504 there are ribs 620 which are manufactured in such a way that they block the path through the cylindrical void 504, but are pliable enough that the ribs 620 migrate when an output fiber cable 112 is placed through cylindrical void 504 and seal around the output fiber cable 112. In at least one embodiment, the output grommet 220 is designed with three such ribs 620. This creates two void regions within the output grommet 220 which are described as chambers 610 and 620. These chambers 610 and 620 can then be filled, if desired, with a sealing material to further ensure that an environmental seal is made between the environmental side of the output grommet 220 and the enclosure side of the output grommet 220. The output fiber cables 112 are placed into the output grommet 220 by forcing the two halves of the output grommet 220 apart at the axis split 520. Then, an output fiber cable 112 can be placed into one cylindrical void 504. After which the two halves of the output grommet 220 can be allowed to spring back together. The at least one rib 620 is pliable enough but yet encompasses the output fiber cable 112 such that as small as a 2 mm fiber cable and as large as a 5 mm fiber cable are locked in place and an environmental seal is created around the fiber cable without damaging the fiber cable.

Figure 7:
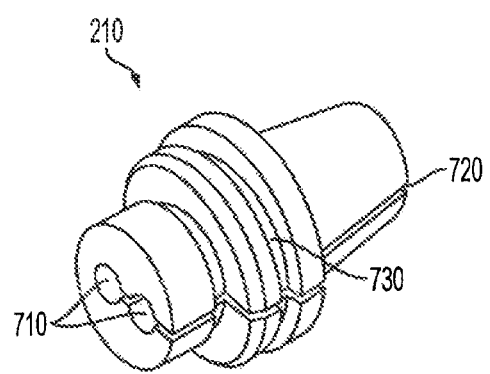
FIG. 7 depicts the input grommet capable of holding up to two, twelve fiber input fiber cables.

FIG. 7 depicts the input grommet 210 capable of holding up to two, twelve fiber input cables 110. The input grommet 210 features a mounting channel 730, a split 720, and at least one input cable void 710. These features are almost identical to those of the output grommet 220 described above with reference to FIGS. 5 and 6. In at least one embodiment, the difference is that the input grommet 210 has only one channel which helps seal against the wall of the enclosure 200 at the input grommet cutout. Otherwise, the void 710, ribs (not shown), and chambers (not shown) behave in the same manner as the corresponding parts of the output grommet 220. The input fiber cable 110 is locked into position by the input grommet 210 while under typical stationary tension. However, the input grommet 210 is designed such that an installer can feed input fiber cable 110 through the installed input grommet 210 from the spool 202 and also retract the input fiber cable 110 back onto the spool 202 through the input grommet 210 without damaging the input fiber cable 110.

While an illustrative embodiment of the invention has been described above, it is, of course, understood that various modifications will be apparent to those of ordinary skill in the art. Such modifications are within the spirit and scope of the invention, which is limited and defined only by the appended claims.

The invention claimed is:

1. A fiber distribution terminal (FDT) for use in an environmentally sealed enclosure, comprising:
    a rotatable spool for housing input fiber cables, the spool being configured to be mounted in the environmentally sealed enclosure;
    an adapter pack for securing connections between fibers of the input fiber cables and fibers of output fiber cables; and
    an adapter plate for routing the input and the output fiber cables between the spool and an opening in the enclosure.

2. The FDT of claim 1, wherein the spool is configured to store at least 200 ft of two separate 12-fiber cables.

3. The FDT of claim 1, wherein the spool is configured to function as a shipping container for the input fiber cables.

4. The FDT of claim 1, further comprising a handle coupled to the spool that is configured to manually retract excess cable routed through a second opening in the enclosure back onto the spool.

5. The FDT of claim 1, wherein the adapter plate is configured to allow up to 70 mm boots on the cable connectors and up to 4.8 mm diameter output cables.

6. The FDT of claim 5, wherein the adapter plate is configured to allow the use of Splice On Connectors.

7. The FDT of claim 1, further comprising guides coupled to the adapter plate, the guides being configured to minimize bend loss within the input and output cables.

8. A fiber distribution terminal (FDT) for use in an environmentally sealed enclosure, comprising:
    a rotatable spool for housing input fiber cables, the spool being configured to be mounted in the enclosure;
    an adapter pack for securing connections between fibers of the input fiber cables and fibers of output fiber cables; and
    a spool lock coupled to the spool configured to impede rotation of the spool so that the cable routing can be directed to one of a first side or a second side of the FDT.

9. The FDT of claim 8, wherein the spool is configured to store at least 200 ft of two separate 12-fiber cables.

10. The EDT of claim 8, wherein the spool is further configured to function as a shipping container for the input fiber cables.

11. The FDT of claim 8, further comprising a handle coupled to the spool that is configured to manually retract excess cable routed through an opening in the enclosure back onto the spool.

12. The FDT of claim 8, further comprising an adapter plate for routing input and output cables between the spool and a second opening in the enclosure.

13. The FDT of claim 12, further comprising guides coupled to the adapter plate, the guides being configured to minimize bend loss within the output cables.

* * * * *